United States Patent Office 3,164,665
Patented Jan. 5, 1965

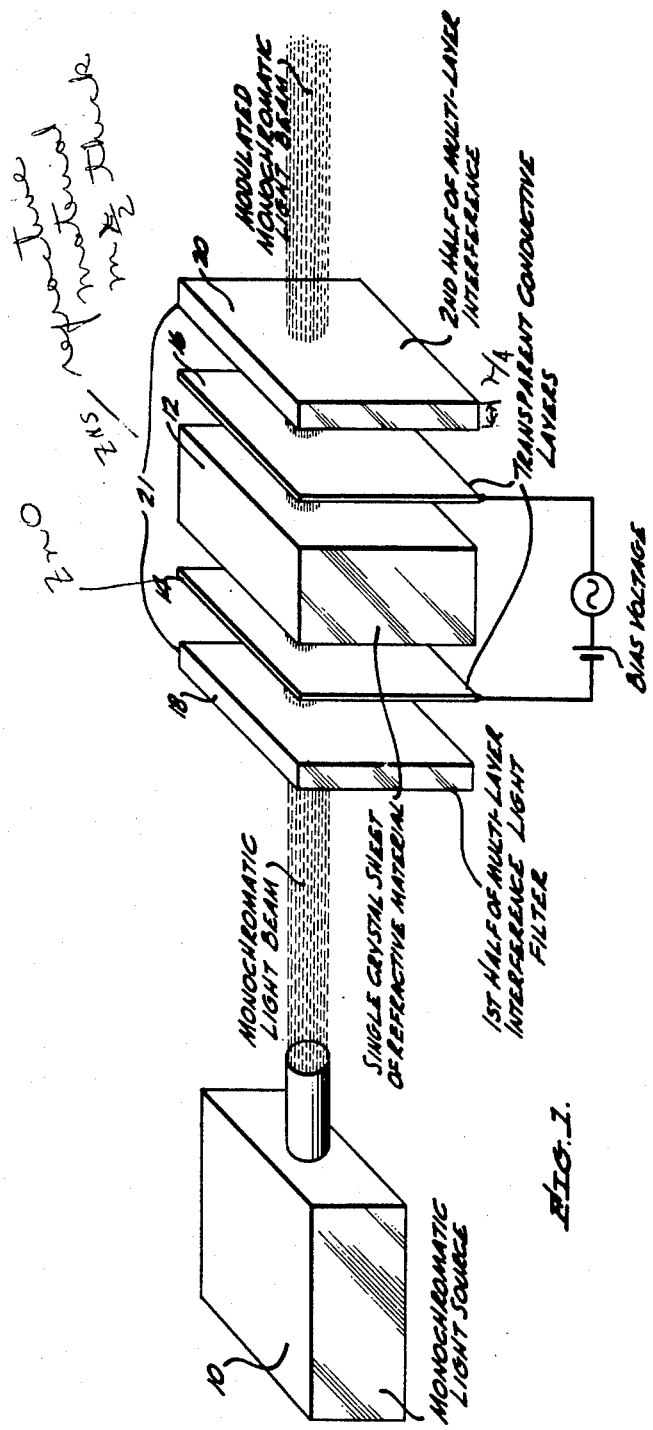

3,164,665
ELECTRO-OPTICAL LIGHT SHUTTER
Phyllis E. Stello, Newport Beach, Calif., assignor to Hughes Aircraft Company, Culver City, Calif., a corporation of Delaware
Filed July 30, 1962, Ser. No. 213,236
8 Claims. (Cl. 88—61)

This invention relates to a shutter capable of operating at sub-microsecond speeds and, more particularly, to apparatus adapted to transmit light within a predetermined portion of the spectrum for determinable intervals of time and of an intensity proportional to a low-amplitude modulating signal.

It is the present practice to obtain sub-microsecond exposures through the use of what is known as a "Kerr Cell" or, alternatively, through the use of anisotropic single crystals. Both of the foregoing light shutters have been used successfully. The Kerr Cell, however, has the disadvantage in that it requires extremely high voltages and extremely high power to operate and it is difficult if not impracticable to modulate the device in a linear manner. As a result, high energy pulse discharge techniques which utilize electrostatic or electromagnetic storage are commonly employed. Light shutters built about electrically-variable anisotropic cells function by rotating the plane of polarization of the light transmitted through two crossed polarizers; in this manner, they modulate the beam according to a sine-squared function. Thus, the non-linearity results primarily from the mode of operation, rather than from th ehigh voltage and power requirement.

In addition to the foregoing, apparatus employing multilayer interference light filters has been proposed. A difficulty with this apparatus is that it possesses a high input capacitance making it difficult to produce variations in the modulating signals at video frequencies. lastly, the cut-off characteristic of conventional multi-layer interference light filters has been found to be too broad to utilize the shift in the portion of the spectrum passed by the filter produced by variations in potential gradient thereacross.

It is therefore an object of the present invention to provide an improved shutter capable of operating at sub-microsecond speeds.

Another object of the present invention is to provide apparatus capable of allowing selected portions of the light spectrum to pass therethrough for electronically determined intervals of time.

Still another object of the present invention is to provide an electronically operable low-power, low-voltage light shutter capable of modulating a beam of light with video information.

In accordance with the present invention, first and second transparent conductive coatings or layers are disposed on opposite sides of a single-crystal sheet of, for example, zinc sulfide, or other piezoelectric material, and are used to control and/or vary the voltage gradient thereacross. This single-crystal sheet is several hundred times one-half light wavelength thick at the frequency to be passed. Lastly, reflecting layers, each one-quarter wavelength thick constituting two halves of a multilayer interference light filter, are disposed in contact with the exposed sides of the first and second transparent conductive coatings.

In operation, the above-mentioned single-crystal sheet, the conductive coatings together with the reflecting layers of the interference filter are illuminated from a source of monochromatic light of a wavelength which corresponds generally with the portion of the light spectrum passed by the reflecting layers. The extent to which this portion of the light spectrum is passed is determined by the location of at least one rejection-band produced by the single-crystal sheet of zinc sulfide in conjunction with the reflecting layers of the interference filter, which location is controlled by the voltage applied thereacross by means of a voltage applied to the first and second transparent conductive coatings. In view of the thickness of the single-crystal sheet of several hundred one-half wavelengths of light within the portion of the light spectrum passed in conjunction wtih the multilayer light filter, a comparatively small change in voltage across the single-crystal sheet shifts the rejection-band thereof away from coincidence with the passband thereby allowing light to proceed through the shutter. The intensity of this light increases as the passband is progressively "uncovered" by the rejection-band produced by interaction of the single-crystal sheet and the reflecting layers of the multilayer interference light filter.

The above-mentioned and other features and objects of this invention and the manner of obtaining them will become more apparent by reference to the following description taken in conjunction with the accompanying drawings, wherein:

FIG. 1 illustrates an exploded perspective view of a preferred embodiment of the invention; and
FIG. 2 illustrates characteristics of the apparatus of FIG. 1.

Referring now to FIG. 1, the electro-optical light shutter apparatus of the present invention comprises a monochromatic light source 10 which directs a beam of monochromatic light through a single crystal sheet of refractive material 12. Transparent conductive layers 14, 16 are disposed on both sides of the single crystal sheet of refractive material 12 and may, for example, be of the type provided by evaporating a thin coating of zinc oxide over the respective surfaces of the sheet 12 followed by sputtering gold or silver over the zinc oxide layer. The resistivity of zinc oxide and sputtered gold or silver coatings of this type may be as low as four ohms per square.

Lastly, a plurality of reflecting layers constituting first and second halves 18, 20 of a multilayer interference light filter 21 are disposed in contact with the transparent conductive layers 14, 16, respectively. The light filter 21 is made uniformly thick so that light, if transmitted at all, is transmitted uniformly through all illuminated portions of the entire filter. The respective halves 18, 20 of the filter 21 are made of alternate layers of material having a low index of refraction such as, for example, cryolite and layers of material having a high index of refraction such as, for example, zinc sulfide. The layers of material having a low index of refraction are disposed in contact with the transparent conductive layers 14, 16 and are alternated with layers of material having a high index of refraction until each half 18 and 20, for example, contains a total of five layers. Each of the layers have a thickness of one-quarter wavelength of the monochromatic light beam produced by the monochromatic light source 10. A thickness of 0.6 microns is typical for each of the halves 18 or 20 of the interference light filter 21.

In fabricating the single crystal sheet of refractive material 12, a single crystal composed of, for example, zinc sulfide, is first grown or formed. A process for growing single crystals is described in Journal of Applied Physics, vol. 32, No. 7, p. 1278. (W. W. Piper and S. Polich.) This single crystal is oriented and sliced normal to the (111) plane and lapped as close as possible to a thickness of $N\lambda/2$ wherein N is a large integer such as 587 and $\lambda/2$ is one-half wavelength of the monochromatic light produced by monochromatic light source 10 within the crystal material Lastly, a material having an index of refraction that is substantially the same as that of the single crystal material is evaporated on the sheet 12 to increase the thickness thereof to exactly $N\lambda/2$. This is accomplished by interferometric measurement during deposition. The final thickness of the single crystal sheet 12 is of the order of 2 mils. The transparent conductive layers 14, 16, and the first and second halves 18, 20 of the multilayer interference light filter are disposed on the surface of the single crystal sheet 12 thus fabricated as previously described.

A typical interference filter consists of alternate layers of high and low index films such as zinc sulfide ($\mu=2.3$) and cryolite ($\mu=1.3$). A simple version of a dielectric interference filter consists of alternate layers of high index and low materials, each with a thickness of one-quarter wavelength with a one-half wavelength layer of high index material sandwiched between them as follows:

| Material  | L | H | L | H$_M$ | L | H | L |
|---|---|---|---|---|---|---|---|
| Thickness | $\lambda/4$ | $\lambda/4$ | $\lambda/4$ | $\lambda/2$ | $\lambda/4$ | $\lambda/4$ | $\lambda/4$ | wherein H represents the high index material such as zinc sulfide and L represents the low index material such as cryolite. The filter can also be constructed with the low index material in the central or spacer layer. The filter of the present invention, on the other hand, is constructed as follows:

| Material  | L | H | L | H$_M$ | L | H | L |
|---|---|---|---|---|---|---|---|
| Thickness | $\lambda/4$ | $\lambda/4$ | $\lambda/4$ | *100-$\lambda$/2's | $\lambda/4$ | $\lambda/4$ | $\lambda/4$ |

*Greater than.

Where a precise transmission characteristic is required, the filter design can be adjusted by slightly altering the thickness of the layers or by using more than one low index and/or high index material. The one-quarter wavelength layers provide the reflecting surfaces while the N times one-half wavelength layer or spacer determines the characteristics of the transmission band, N being no less than 100.

Under the above circumstances, the transmission, $t$, through the apparatus of the present invention when operating as a filter, is given by $$t=\left[\left(1+\frac{A}{T}\right)^2+\frac{4R}{T^2}\sin^2(\delta+\varphi)\right]^{-1} \quad (1)$$

wherein:

$R+T+A=1$ $$\delta=\frac{(2\pi\mu\cos\psi)}{\lambda}$$

$\mu$=refractive index of spacer
$d$=thickness of spacer
$\psi$=angle of incidence (normally equal to 0°)
$\varphi$=phase shift in spacer layer on reflection from reflecting surface
$A$=absorption of reflecting surfaces
$T$=transmission of reflecting surfaces
$R$=reflectivity of reflecting surfaces
$\lambda$=wavelength in air of the incident light From Equation 1 it is evident that maximum transmission occurs when $$\delta+\varphi=\frac{n\pi}{2}$$

$$n=0, 2, \ldots 4, 6, \ldots \quad (2)$$

and minimum transmission occurs when $$\delta=\varphi=\frac{n\pi}{2}$$

$$n=1, 3, 5 \ldots \quad (3)$$

Evaporated films are either non-crystalline or randomly oriented crystallites and have effective indexes of refraction that are not changed by electric fields. The sheet 12 of refractive material is accordingly composed of single crystal material or films deposited in a manner such that crystallite orientation is achieved.

The single-crystal sheet 12 of refractive material is oriented so that the direction of the incident monochromatic light beam is parallel to an optic axis thereby to avoid double refraction, i.e., $\psi=0°$. Since many of the required constants of zinc sulfide are generally known, zinc sulfide will be employed as the substrate material by way of example to demonstrate an analysis. When an electric field is applied across the surfaces of a ZnS (zinc sulfide) crystal cut perpendicular to the (111) plane, the index of refraction parallel to the (111) plane is given by:

$$\mu_x=\mu_0+\frac{1}{2\sqrt{3}}\mu_0^3 r_{41}E \quad (4)$$

wherein:

$\mu_0$=index with no field=2.490 (4358 A.)
$r_{41}$=electro-optical coefficient=$2.14\times10^{-10}$ cm./volt
$E$=applied field (volts/centimeter)

The electric field, of course, is limited by the dielectric strength of the sheet across which it is applied. A dielectric strength of $10^{-3}$ volts/A. for the sheet 12 of refractive material is within reasonable limits. Thus, on the basis of the foregoing premises, Equation 4 indicates that a maximum value of E of $10^5$ volts/centimeter corresponds to a maximum possible change, $\Delta\mu$, in the index of refraction, $\mu_0$, for zinc sulfide of $1.14\times10^{-4}$.

For maximum shutter effect, the transmission must change from a maximum to a minimum in accordance with Equations 2 and 3 above. This change occurs when $$\delta_1-\delta_2=\frac{\pi}{2}$$

where $\sigma_1$, $\sigma_2$ correspond, respectively, to the maximum and minimum indexes of refraction produced by the application of an electric field across the sheet 12. Thus, if the angle of incidence is assumed to be zero, this condition is satisfied when $$d=\frac{\lambda}{4\Delta\mu} \quad (5)$$

where $\Delta\mu$ is the change in the index of refraction due to the application of the electric field. In the case where the single crystal sheet 12 is composed of ZnS, it has been shown that the maximum possible change in the index of refraction $\Delta\mu=1.14\times10^{-4}$. Thus, in the case of a single crystal sheet of ZnS, the thickness of the single crystal sheet 12 should equal $$\frac{10,000}{4.56}\lambda$$

or 2193 wavelengths to achieve maximum and minimum transmission.

It is not, however, necessary to achieve maximum and minimum transmission through the apparatus of the present invention to provide adequate shutter operation. Consider a seven layer zinc sulfide-cryolite interference filter 21 with the single-crystal sheet 12 adjusted for peak transmission at 4300 A. ($R=0.983$; $T=0.012$; $A=0.005$) and having a thickness of $d=587$ one-half wavelengths. Assuming that only the index of refraction of the single-crystal sheet 12 of zinc sulfide is altered by the applied electric field, it can be shown by Equation 1 that the transmission maximum is shifted by 0.2 A. By using the monochromatic source of light 10 together with a shutter incorporating a filter with a high order of interference, very narrow and closely spaced transmission bands can be realized so that the change of 0.2 A. in wavelength for maximum transmission becomes a significant change. That is, the transmission bands are substantially less than 0.2 A. in width. (The change in wavelength for a given applied field is substantially unaffected by the thickness of the single-crystal sheet 12.) For example, the bandwidth of a single-crystal sheet 12 having a thickness of 587 one-half wavelengths in conjunction with reflecting layers of the two halves of the interference filter 21 is 0.0646 A. Also, (the transmission peaks are separated by an amount of the order of 7.3 A. which assures that there will be no inter-order interference. Thus, the change of 0.2 A. can amount to a shift from concurrence with the transmission band 30 (FIG. 2) centered, for example, at 4300.0 A. to a transmission band 31 centered at 4300.2 A. whereby only overlapping portions are transmitted.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. An optical apparatus for controlling the passage of light within a discrete range of wavelengths of the light spectrum, said apparatus comprising:
    (a) a spacer layer of material having crystallite orientation and of a uniform thickness, said thickness being an integral number of no less than 100 one-half predetermined wavelengths within said discrete range of wavelengths;
    (b) means responsive to an electrical signal for producing a uniform controllable potential gradient across said spacer layer;
    (c) a plurality of layers each one-quarter of said predetermined wavelength thick and of a first index of refraction disposed on both sides of said spacer layer; and
    (d) a layer one-quarter of said predetermined wavelength thick and of a second index of refraction disposed intermediate each adjacent pair of said plurality of layers of said first index of refraction on both sides of said spacer layer and intermediate said spacer layer and the immediately adjacent layers of said first index of refraction, said second index of refraction being different from said first index of refraction.

2. The optical apparatus for controlling the passage of light within a discrete range of wavelengths of the light spectrum as defined in claim 1 wherein said first index of refraction substantially equals the index of refraction of said spacer layer.

3. The optical apparatus for controlling the passage of light within a discrete range of wavelengths of the light spectrum as defined in claim 1 wherein said second index of refraction substantially equals the index of refraction of said spacer layer.

4. The optical apparatus for controlling the passage of light within a discrete range of wavelengths of the light spectrum as defined in claim 1 wherein said first index of refraction is greater than said second index of refraction.

5. The optical apparatus for controlling the passage of light within a discrete range of wavelengths of the light spectrum as defined in claim 1 wherein said spacer layer of a material having crystallite orientation has a (111) axis, and wherein said (111) axis is oriented normal to said spacer layer.

6. The optical apparatus for controlling the passage of light within a discrete range of wavelengths of the light spectrum as defined in claim 1 which includes additional means for illuminating at least a portion of one side of said spacer layer with monochromatic light of said predetermined wavelength thereby to control the passage of said light through to the opposite side of said optical apparatus.

7. An optical apparatus for controlling the passage of light within a discrete range of wavelengths of the light spectrum, said apparatus comprising:
    (a) a single crystal sheet of reflective material of uniform thickness having a (111) axis oriented normal to the surfaces thereof, said thickness being an integral number of no less than 100 one-half predetermined wavelengths within said discrete range of wavelengths;
    (b) first and second thin transparent conductive coatings disposed on both sides of said sheet;
    (c) a plurality of layers each one-quarter predetermined wavelength thick and having alternately high and low indexes of refraction disposed on said first and second transparent conductive coatings; and
    (d) means connected to said first and second transparent conductive coatings for producing a potential gradient across said single crystal sheet thereby to control the relative position of the rejection band of said apparatus with respect to the position of the passband within the light spectrum.

8. The optical apparatus for controlling the passage of light within a discrete range of wavelengths of the light spectrum as defined in claim 7 wherein said single crystal sheet is composed of a single crystal sheet of zinc sulfide of a thickness equal to no less than 500 one-half predetermined wavelengths.

References Cited in the file of this patent

UNITED STATES PATENTS 2,960,914    Rogers    Nov. 22, 1960
3,025,763    Schwartz et al.    Mar. 20, 1962

UNITED STATES PATENT OFFICE
CERTIFICATE OF CORRECTION

Patent No. 3,164,665                  January 5, 1965

Phyllis E. Stello

It is hereby certified that error appears in the above numbered patent requiring correction and that the said Letters Patent should read as corrected below.

Column 3, line 14, after "low" insert -- index --; lines 51 and 52, the equation should appear as shown below instead of as in the patent:

$$\delta = \frac{(2\pi\mu d \cos \psi)}{\lambda}$$

Signed and sealed this 3rd day of August 1965.

(SEAL)
Attest:

ERNEST W. SWIDER
Attesting Officer

EDWARD J. BRENNER
Commissioner of Patents